April 28, 1964     A. VERDUIN     3,131,373
LOAD CELL FOR MEASURING DEVICES
Filed July 17, 1961

*INVENTOR.*
ADRIANUS VERDUIN
BY
ATTORNEYS

United States Patent Office 3,131,373
Patented Apr. 28, 1964

3,131,373
LOAD CELL FOR MEASURING DEVICES
Adrianus Verduin, Pynacker, Netherlands, assignor to Maatschappij van Berkel's Patent N.V., Rotterdam, Netherlands, a limited-liability company of the Netherlands
Filed July 17, 1961, Ser. No. 124,435
Claims priority, application Netherlands July 16, 1960
8 Claims. (Cl. 338—5)

This invention relates in general to a load cell for measuring devices, and particularly to a load cell capable of obtaining a linear output.

The present invention comprises a thin walled hollow cylindrical member having enlarged end rings, and wherein the wall has a generally sine shape. Resistance strain gauges are attached to the wall of the load cell in order to detect the stress elongation for measuring loads applied to the cylinder. More particularly, uniformly distributed loads are applied along the periphery of the end rings, and this load is measured by the resistance strain gauges attached to the cylindrical member. For an accurate measurement of the moment or axial force applied to the cylindrical member, it is desirable to have the output signal of the load cell increased proportionately with the magnitude of the force measured.

Heretofore, the relation between the output signal and measured force has been non-linear, such as in the measuring cylinder set forth in the German Patent 1,050,571. As set forth in the German patent, an exact cylinder loaded by axial forces will have a non-linear relationship between the output signal and force due to the barrel or bulging shape of the cylinder when it is receiving a load. It is known that this non-linearity is only a fraction of the total non-linearity and that this linearity due to the barrel shape of the cylinder can be avoided by giving the cylinder a special configuration. The special configuration of the measuring cylinder in the German patent will at the most avoid only slightly the mechanical non-linearity, but will not avoid the electrical non-linearity that is a result from the applied bridge circuit. Further disadvantages in the measuring cylinder set forth in the German patent are that due to its shape, a low output signal is first obtained as a result of the low tensions in the thick parts where the strain gauges are fixed, and then leads to high tensions in the thin parts, which causes undesired creep and plastic deformation.

Another such form of measuring device is disclosed in United States Patent 2,883,504, wherein the measuring element comprises a steel rod with a cast iron core. In this U.S. patent, the principle involved is that the steel has an opposite characteristic compared with a cast iron and therefore compensates for the non-linearity. The disadvantages in using such rods instead of cylinders are that there is less room available for the mounting of strain gauges than on an equivalent thin walled cylinder section, that there is less deformation and thus a lower output signal, that there is insufficient horizontal rigidity and a greater sensitivity for off-center loads and greater bending stresses, and that deviations of the correct position of the strain gauges have relatively greater effect.

Generally, it can be stated that the mechanical non-linearity is a result of the properties of the material, the form of the measuring cylinder and the properties of the resistance strain gauges. On the other hand, the electrical non-linearity is caused by the properties of the applied bridge circuit and only partly by the properties of the measuring cylinder.

Accordingly, it is an object of this invention to obviate the difficulties above set forth and compensate for non-linearity in a load cell by providing a uniquely formed measuring cylinder.

A further object of this invention resides in the provision of a load cell for measuring devices which obviates the objections of heretofore known devices and makes it possible to compensate for both mechanical and electrical non-linearity.

A further object of the present invention is in the provision of a load cell for measuring devices which is constructed to provide accurate, and linear measuring for weighing of relatively heavy loads, and to particularly obtain a linear output.

Other objects, features and advantages of the invention will be apparent from the following detailed disclosure, taken in conjunction with the accompanying sheet of drawings, wherein like reference numerals refer to like parts, in which.

Figure 1:
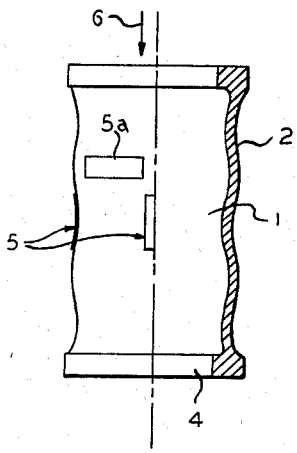
FIG. 1 is a partly elevational and sectional view of a load cell according to the invention.

Referring now to the drawings, and particularly to FIG. 1, the load cell of the present invention is seen to comprise a nearly cylindrical member 1 having a sine shaped or corrugated wall 2 of substantially constant thickness and upper and lower enlarged end rings 3 and 4. Resistance strain gauges 5 and 5a are shown attached to the sine shaped wall 2 for measuring the load. The sine shaped wall 2 is constructed to correspond with one of the buckling forms calculated with the theory of elasticity. These buckling forms are dependent upon load. Due to this form variation, the strain as a result of the axial load will increase non-linearity with the magnitude of the force to be measured, and by the calculated buckling form, this non-linearity will be the same and opposed to the non-linearity which appears at the exact cylinder. The form variations of the exact cylinder are however small, so that the additional tensions resulting from the buckling will also appear in small limits. The variations are approximately one percent of the cylinder diameter.

The sine shaped wall 2 which is of substantially uniform thickness may have its inner or outer wall exactly cylindrical and the other wall formed in accordance with the calculated buckling form, or both inner and outer walls may be formed in accordance with the buckling form as shown in FIG. 1. Thus, the cylindrical wall 2 is pre-shaped in accordance with pre-calculations of size and diameter. Generally, the load cell will be constructed of steel, although other metals may be used if so desired, and it should be appreciated that any number of complete sine waves may be employed along the wall of the cylindrical.

The strain gauges 5 and 5a are equally spaced along the circumference of the cylindrical wall 2 and also spaced in accordance with a predetermined calculation between the top and bottom of the cylinder. Two or more strain gauges may be employed and the strain gauges 5 serve to detect the stress elongation action while the strain gauges 5a serve to compensate for temperature. It should be appreciated that the capacity of the load cell depends not only on the metal used but also the thickness of the wall and its construction. The load measured will be applied in accordance with the arrow 6 as shown in FIG. 1 onto the upper end ring 3.

The top and bottom end rings form reinforced areas at the opposite ends of the cylinder and serve to equally distribute the load over a greater area of the cylinder when a point load is involved slightly off-center. It is quite apparent that such reinforcing need not be employed if the load is to be directly in line with the axis of the cylinder, but by having the reinforcing rings the need of certain precautions is eliminated.

Figure 2:
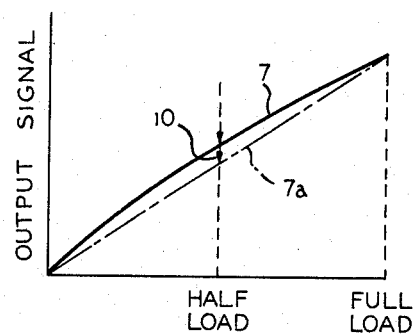
FIG. 2 is a graphical illustration showing the non-linearity obtained by use of an exact cylinder, solid in form.

FIG. 2 illustrates the relation between the output signal and the load, wherein the output signal is measured along the vertical and the load is measured along a horizontal. The solid line designated by the numeral 7 represents the measuring action of an exact cylinder, while the dotted line 7a represents linearity. Therefore, the distance 10 represents the non-linearity at half load.

Figure 3:
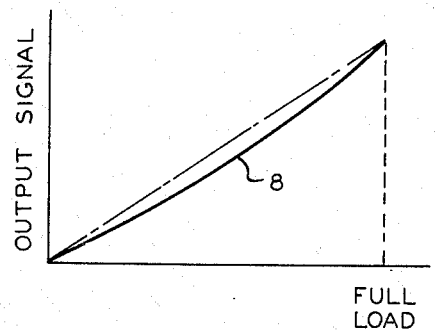
FIG. 3 is a graphical illustration showing the theoretical relation for a cylinder with form variations calculated for one of the buckling forms.

FIG. 3 also illustrates the relationship between output signal of a load cell and load, wherein the broken line again represents linearity and the solid curved line 8 represents the theoretical relation for a cylinder with form variations calculated for one of the buckling forms. Thus, the theoretically determined curve 8 is only the result of the form variations of the measuring cylinder.

Figure 4:
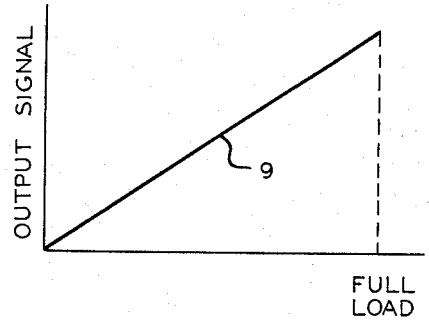
FIG. 4 is a graphical illustration of the linearity obtained by the present invention.

FIG. 4 also represents the relation between the output signal and load and illustrates the straight line 9 showing linearity which is accomplished by the present invention. Essentially, the non-linearity which appears according to curve 7 is compensated by the non-linearity according to the curve 8 which is a result of the form variations of the cylinder to obtain the straight line 9.

Due to the foregoing, it should be appreciated that the load cell of the present invention which is particularly adaptable for use in force or weight measuring devices, is capable of providing a linear output.

It will be understood that modifications and variations may be effected without departing from the scope of the novel concepts of the present invention, but it is understood that this application is to be limited only by the scope of the appended claims.

The invention is hereby claimed as follows:

1. A load cell for a measuring device comprising a hollow measuring cylinder and adapted to measure axially applied loads, said cylinder having a realtively thin side wall with one of its faces formed axially in vertical section to correspond with one of the buckling forms of the cylinder, and measuring elements attached to said side wall to measure the stress deformation thereof when a load is applied to said device.

2. A load cell for a measuring device comprising a hollow measuring cylinder and adapted to measure axially applied loads, said cylinder having a relatively thin side wall with one of its faces formed axially in vertical section to correspond with one of the buckling forms of the cylinder, and resistance strain gauges attached to said side wall to measure the stress deformation thereof when a load is applied to said device.

3. A load cell for a measuring device comprising a hollow measuring cylinder and adapted to measure axially applied loads, said cylinder having a relatively thin side wall with one of its faces formed axially in vertical section to correspond with one of the buckling forms of the cylinder, a reinforcing ring on at least one end of said side wall, and resistance strain gauges attached to said side wall to measure the stress deformation thereof when a load is applied to said device.

4. A load cell for a measuring device comprising a hollow measuring cylinder and adapted to measure axially applied loads, said cylinder having a relatively thin side wall with one of its faces formed axially in vertical section to correspond with one of the buckling forms of the cylinder, reinforcing rings at opposite ends of said side wall, and resistance strain gauges attached to said side wall to measure the stress deformation thereof when a load is applied to said device.

5. A load cell for a measuring device comprising a hollow measuring cylinder and adapted to measure axially applied loads, said cylinder having a relatively thin side wall with one of its faces formed axially in vertical section to correspond with one of the buckling forms of the cylinder, the thickness of said side wall being substantially uniform, and resistance strain gauges attached to said side wall to measure the stress deformation thereof when a load is applied to said device.

6. A load cell for a measuring device comprising a hollow measuring cylinder and adapted to measure axially applied loads, said cylinder having a relatively thin side wall of substantially uniform thickness, the inner surface of said side wall being cylindrical and the outer surface being sine-shaped along the longitudinal axis so that the median of a section formed by the inner and outer surfaces corresponds with a calculated buckling form, and resistance strain gauges attached to said side wall to measure the stress deformation thereof when a load is applied to said device.

7. A load cell for a measuring device comprising a hollow measuring cylinder and adapted to measure axially applied loads, said cylinder having a relatively thin side wall of substantially uniform thickness, the side wall having a sine shape along the longtiudinal axis so that the median of a section formed by the inner and outer surfaces corresponds with a calculated buckling form, and resistance strain gauges attached to said side wall to measure the stress deformation thereof when a load is applied to said device.

8. A load cell as defined by claim 7, and reinforcing rings at opposite ends of said side wall.

References Cited in the file of this patent

UNITED STATES PATENTS

| | | |
|---|---|---|
| 2,566,326 | Guillemin | Sept. 4, 1951 |
| 2,729,730 | Brady | Jan. 3, 1956 |
| 2,883,504 | Thurston | Apr. 21, 1959 |
| 2,933,707 | Blystone et al. | Apr. 19, 1960 |

FOREIGN PATENTS

| | | |
|---|---|---|
| 1,050,571 | Germany | Feb. 12, 1959 |